Figure 3:
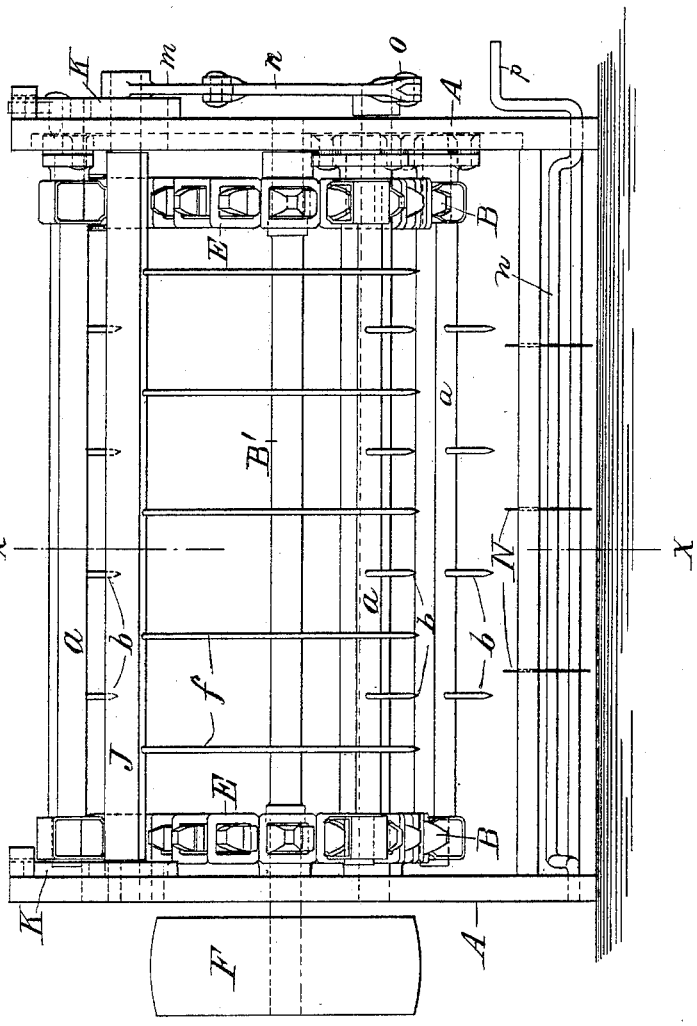

(No Model.) 2 Sheets—Sheet 1.
C. J. GOULETTE.
FEEDER FOR THRASHING MACHINES.
No. 435,824. Patented Sept. 2, 1890.
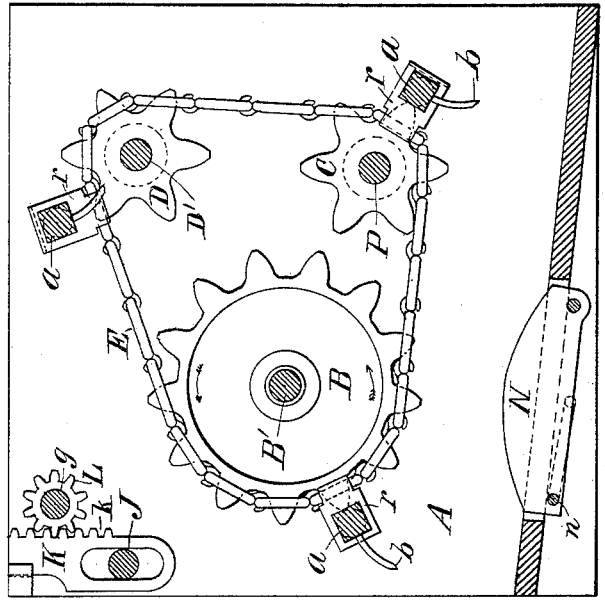
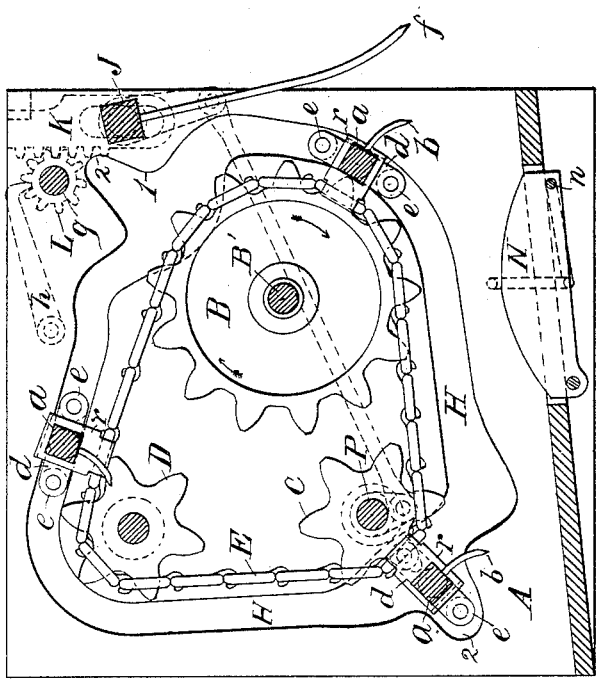
WITNESSES:
INVENTOR:
C. J. Goulette
BY
Munn & Co.
ATTORNEYS (No Model.) 2 Sheets—Sheet 2.

C. J. GOULETTE.
FEEDER FOR THRASHING MACHINES.

No. 435,824. Patented Sept. 2, 1890.

WITNESSES:

INVENTOR:
C. J. Goulette
BY Munn & Co.
ATTORNEYS

UNITED STATES PATENT OFFICE.

CYRIL J. GOULETTE, OF ELLENDALE, (DAKOTA TERRITORY,) NORTH DAKOTA.

FEEDER FOR THRASHING-MACHINES.

SPECIFICATION forming part of Letters Patent No. 435,824, dated September 2, 1890.

Application filed October 15, 1889. Serial No. 327,085. (No model.)

*To all whom it may concern:*

Be it known that I, CYRIL J. GOULETTE, a citizen of the United States, residing at Ellendale, in the county of Dickey and State of North Dakota, have invented a new and useful Feeder for Thrashing-Machines, of which the following is a full, clear, and exact description.

The objects of my invention are, first, to provide a machine that will automatically feed the thrashing-machine and cut the bands of the grain; second, to provide a machine that will feed both bundles and loose grain, and, third, to provide a machine that will feed the grain very evenly, thereby increasing the capacity of the thrashing-machine by keeping it constantly at work. This quality of providing an even feed is especially valuable in thrashing flax, as that is very apt to rush through the machine without being properly thrashed.

My invention consists in certain features of construction and combinations of parts, hereinafter described, and more specifically pointed out in the claims.

Reference is to be had to the accompanying drawings, forming a part of this specification, in which similar letters and figures of reference indicate corresponding parts in all the figures.

Figure 1 is a sectional view on the line $x\,x$ in Fig. 3, showing one side of the machine and the grooved track for guiding the feed-bars. Fig. 2 is a section on the same line, showing the opposite side of the machine; and Fig. 3 is a front elevation looking through the machine.

In the accompanying drawings, A is the frame of the machine, which is open at both front and rear and is made of a suitable size to connect with the front end of a thrashing-machine.

On the inside of the frame A, and on opposite sides of the machine, are arranged three sets or pairs of sprocket-wheels B, C, and D. These wheels are hung upon the shafts B′, P, and D′, running across the machine, and are provided with teeth to engage the endless chains E. The wheels are arranged in a triangular position on each side of the frame A, the large wheels B being placed in the front part of the machine and the small wheels D and C in the back part of the machine in the upper and lower corners, respectively. The shaft B′, which carries the large wheels B, extends through to the outside of the frame, and is provided with a pulley F, which connects with the thrashing-machine by a belt, thus furnishing power.

Attached to the endless chains E, which pass over the wheels B, C, and D, are hangers $r$, carrying cross-bars $a$. These bars are provided with inwardly-curved teeth $b$, which are attached to the bars $a$ in such a manner that as the bars come over the large wheels B and approach the bottom of the machine the teeth will catch hold of the grain and drag it through the machine to the beater of the thrashing-machine. The cross-bars $a$ are hung in the hangers $r$ in such a manner that they may turn therein. One end of the cross-bars $a$ is provided with a cross-head $d$. The cross-head $d$ is provided with two wheels $e$, which run in the grooved track H. The track H is a groove on the inside of the frame A, and in its course must correspond very nearly to the circumference of the three wheels B, C, and D, over which the endless chains E run, in order that the cross-heads $d$ of the bars $a$ may easily run in it. The grooved track H at the front part of the machine above the wheel B, and at the back part of the machine below the wheel C, is made enlarged and curved, so that it acts like a cam adapted to tip over the cross-heads $d$ and wheels $e$, and consequently the cross-bars $a$, which are rigidly attached to said cross-heads, thus changing the position of the teeth $b$. For instance, when a cross-head $d$ and wheels $e$ come down the track H toward the front of the machine, the forward wheel, owing to the shape of the groove H, is forced across the enlargement of the groove above the wheel B till it strikes the point 1. It is then forced up into the elbow of the cam 2, and the forward motion of the chain E carries the rear wheel ahead, thus tipping the cross-bar $a$ completely over and throwing the teeth $b$ into a position to catch the grain and drag it through the machine. When the wheels and cross-head reach the cam at the rear of the machine, the crosshead $d$, wheels $e$, and cross-bar $a$ are again tipped over, thus throwing the teeth $b$ backward, so that they can carry no straw up over the machine.

A cross-bar J, provided with long teeth $f$, extends across the upper front portion of the machine. This bar is journaled at each end to the slides K, held on the ends of the frame A. The slides K are slotted to receive the ends of the bar J and provided with a rack $k$, which racks are geared to mesh with the cog-wheels L on the shaft $g$. The height of the cross-bar J is thus regulated by the cog-wheels L, which are held in position by the dog $h$, which engages one of the wheels L.

The cross-bar J extends through the frame A and is provided with a long crank $m$, which is connected by a pitman $n$ to a short crank $o$ on the end of the shaft P. This gives a vibratory motion to the cross-bar J and teeth $f$, thus shaking up the grain which is placed in front of the machine and causing it to pass through more evenly than it otherwise would. The teeth $f$ will have no appreciable effect upon bound grain, and are intended chiefly for shaking up loose grain which may also be fed by the machine.

A series of knives N project above the floor of the machine, and as the grain is pulled through the machine these knives are forced through it, thus cutting the bands with which it is tied. The knives may be of any suitable form and should be vertically adjustable. As shown, the knives N are pivoted at one end to the floor and at the other end on the cranked shaft $n$, extending across and journaled in the frame A. One end of the shaft is extended and provided with a crank-arm $p$, by which the vertical adjustment of the knives is regulated.

The machine being set in motion is operated as follows: The grain to be thrashed is thrown in front of the machine within reach of the teeth $b$. The vibratory motion of the teeth $f$ loosens up the grain and it is seized by the teeth $b$ and carried through the machine past the knives N and deposited at the entrance of the thrashing-machine by the action of the cams in the grooved track H, which reverses the teeth $b$ in the manner heretofore described.

Having fully described my invention, what I claim as new, and desire to secure by Letters Patent, is—

1. A feeder for thrashing-machines, consisting, essentially, of a frame A, having the adjustable knives N in the bottom thereof and the cam-groove H in the side thereof, the sprocket-wheels B C D, the chains E and bars $b$, journaled to the chains E and provided with teeth $b$, cross-heads $d$ on bars $a$, and means, as cross-bar J, having teeth $f$, crank $m$, pitman $n$, crank $o$, and shaft P, for loosening the grain and regulating the feed, substantially as described.

2. In a feeder for thrashing-machines, the combination, with the frame A, having cam-groove H, of the sprocket-wheels B C D, the chains E, bars $a$, journaled to the chains E and provided with teeth $b$, cross-heads $d$ on bars $a$, and the adjustable knives N, substantially as shown and described.

CYRIL J. GOULETTE.

Witnesses:
HENRY DICKIE,
C. E. DICKIE.